United States Patent
Sommers et al.

(10) Patent No.: US 12,481,570 B2
(45) Date of Patent: Nov. 25, 2025

(54) METHODS, SYSTEMS, AND COMPUTER READABLE MEDIA FOR NETWORK TESTING AND COLLECTING GENERATIVE ARTIFICIAL INTELLIGENCE TRAINING DATA

(71) Applicant: Keysight Technologies, Inc., Santa Rosa, CA (US)

(72) Inventors: Christian Paul Sommers, Bangor, CA (US); Peter J. Marsico, Chapel Hill, NC (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 62 days.

(21) Appl. No.: 18/233,270

(22) Filed: Aug. 11, 2023

(65) Prior Publication Data
US 2024/0378125 A1 Nov. 14, 2024

Related U.S. Application Data

(60) Provisional application No. 63/466,242, filed on May 12, 2023.

(51) Int. Cl.
*G06F 11/00* (2006.01)
*G06F 11/22* (2006.01)
*G06F 11/263* (2006.01)

(52) U.S. Cl.
CPC ........ *G06F 11/2268* (2013.01); *G06F 11/263* (2013.01)

(58) Field of Classification Search
CPC .... G06F 11/2268; G06F 11/263; G06F 30/27; G06F 11/2263; G06N 20/00
See application file for complete search history.

(56) References Cited

U.S. PATENT DOCUMENTS

| | | | |
|---|---|---|---|
| 10,073,763 B1* | 9/2018 | Raman | G06N 20/00 |
| 11,070,441 B2 | 7/2021 | Di Pietro | |
| 11,099,237 B2* | 8/2021 | Nochilur | G06F 11/3688 |

(Continued)

FOREIGN PATENT DOCUMENTS

CN 113778894 A 12/2021

OTHER PUBLICATIONS

Combined Search and Examination Report under Sections 17 and 18(3) for GB 2406479.2 (Sep. 24, 2024).

(Continued)

*Primary Examiner* — Loan L.T. Truong

(57) ABSTRACT

Methods, systems, and computer readable media for networking testing. In some examples, a system includes a test controller and a training data collector. The test controller is configured for receiving a test case including test case definition information defining a network test for a system under test (SUT); determining test system resource information for test system resources configured to execute the test case; and executing the test case on the SUT. The training data collector is configured for collecting at least a portion of the test case definition information; collecting SUT status information or SUT configuration information or both for the SUT; collecting metadata associated with the test case including at least one test context label; and processing collected data to produce artificial intelligence training data.

20 Claims, 7 Drawing Sheets

(56) References Cited

U.S. PATENT DOCUMENTS

| | | | |
|---|---|---|---|
| 11,533,247 B2 | 12/2022 | Saxena et al. | |
| 11,550,707 B2 | 1/2023 | Vasavan et al. | |
| 12,106,476 B2* | 10/2024 | Voigt | G06N 3/04 |
| 12,216,758 B2* | 2/2025 | Liu | G06N 3/08 |
| 2019/0012592 A1* | 1/2019 | Beser | G06N 3/063 |
| 2019/0213115 A1* | 7/2019 | Takawale | G06F 11/3692 |
| 2020/0005523 A1* | 1/2020 | Brebner | G01S 5/0278 |
| 2020/0167653 A1* | 5/2020 | Manjunath | G06N 3/082 |
| 2020/0272887 A1* | 8/2020 | Li | G06V 20/10 |
| 2020/0304396 A1 | 9/2020 | Said et al. | |
| 2021/0188306 A1* | 6/2021 | Himayat | H04W 4/40 |
| 2021/0397545 A1* | 12/2021 | Liu | G06F 11/3476 |
| 2022/0036194 A1* | 2/2022 | Sundaresan | G06N 3/063 |
| 2022/0076063 A1* | 3/2022 | Park | G06V 10/82 |
| 2022/0171371 A1* | 6/2022 | Wang | G05B 19/41845 |
| 2022/0210140 A1* | 6/2022 | Dhunay | G06N 20/00 |
| 2022/0250656 A1* | 8/2022 | Ucar | G06V 20/56 |
| 2022/0261535 A1* | 8/2022 | Madaan | G06F 40/279 |
| 2022/0274251 A1* | 9/2022 | Leon | G06N 3/047 |
| 2023/0015477 A1* | 1/2023 | Verburg | G06N 20/00 |
| 2023/0078061 A1* | 3/2023 | Cheng | G06F 7/32 706/12 |
| 2023/0082173 A1* | 3/2023 | Li | G06N 3/045 713/168 |
| 2023/0107148 A1* | 4/2023 | Taheri | H04W 24/08 370/252 |
| 2023/0168994 A1* | 6/2023 | Hans | G06F 16/9024 717/124 |
| 2023/0205917 A1* | 6/2023 | Chalk | G06F 21/6245 726/30 |
| 2023/0245651 A1* | 8/2023 | Wang | G06N 5/022 704/275 |
| 2023/0334370 A1* | 10/2023 | Shi | G06N 20/00 |
| 2023/0342392 A1* | 10/2023 | McCarson | G06F 16/587 |
| 2024/0202107 A1* | 6/2024 | Jari | G06F 11/3684 |
| 2024/0256432 A1* | 8/2024 | Ryszka | G06F 11/3684 |
| 2024/0289636 A1* | 8/2024 | Lu | G06N 3/04 |
| 2024/0296315 A1* | 9/2024 | Singh | G06N 3/045 |
| 2024/0370350 A1* | 11/2024 | Sarvesetty | G06F 11/3698 |
| 2024/0378083 A1* | 11/2024 | Kunz | G06N 3/047 |
| 2025/0053500 A1* | 2/2025 | Barreto | G06F 11/3684 |
| 2025/0258951 A1* | 8/2025 | Thompson | G06F 21/6218 |
| 2025/0277844 A1* | 9/2025 | Rule | G01R 31/28 |
| 2025/0298955 A1* | 9/2025 | Ramirez Beltran | G06F 30/31 |

OTHER PUBLICATIONS

Kyle Wiggers, "OpenAI launches an API for ChatGPT, plus dedicated capacity for enterprise customers", Tech Crunch (Mar. 1, 2023).

"IXNETWORK Rest API Quick Reference Guide", IXIA (2023).

Intention to Grant for GB 2406479.2 (Aug. 15, 2025).

* cited by examiner

FIG. 3

REST API Command syntax:
'xpath' : REST API path on IxN - ["http://10.154.162.75:11009/api/v1/sessions/1/ixnetwork"]
'data' : data input for REST command should be passed in json format as - "json.dumps({})"
'headers' : header to be used for all REST commands - {'content-type': 'application/json'}
'verify' : verify set to 'False' to disable the SSL Certificate
REST commands used in general - GET, POST, PATCH , DELETE , OPTIONS
GET : GET command is used to retrieve the configurations on IxNetwork
POST : POST command is used to create/configure new configurations on IxNetwork
PATCH : PATCH command is for modifying existing configurations on IxNetwork
DELETE : DELETE command is for Deleting the configurations on IxNetwork
OPTIONS : OPTIONS command is for viewing available API command options under given 'xpath'
response = requests.REST( '<xpath>' , data=json.dumps({}) , headers = {'content-type': 'application/json'} )

Create blank configuration:
To create new configuration or remove existing configuration use the POST command with xpath root+'/operations/newconfig' followed by the headers
response = requests.post(root+'/operations/newconfig',
 headers={'content-type': 'application/json'} , verify=False)

Create virtual port 1:
To create new vport use the POST command with xpath root+'/vport' followed by the headers
response = requests.post(root+'/vport', headers={'content-type': 'application/json'} , verify=False)
Create virtual port 2:
To create new vport use the POST command with xpath root+'/vport' followed by the headers
response = requests.post(root+'/vport' , headers={'content-type': 'application/json'} , verify=False)

FIG. 5

```
The first example is a router containing two slots.  Each slot
contains a 3 port router/bridge module.  Each port is represented in
the ifTable.  There are two logical instances of OSPF running and two
logical bridges:

Physical entities -- entPhysicalTable:
    1 Field-replaceable physical chassis:
        entPhysicalDescr.1 ==           'Acme Chassis Model 100'
        entPhysicalVendorType.1 ==      acmeProducts.chassisTypes.1
        entPhysicalContainedIn.1 ==     0
        entPhysicalClass.1 ==           chassis(3)
        entPhysicalParentRelPos.1 ==    0
        entPhysicalName.1 ==            '100-A'
        entPhysicalHardwareRev.1 ==     'A(1.00.02)'
        entPhysicalSoftwareRev.1 ==     ''
        entPhysicalFirmwareRev.1 ==     ''
        entPhysicalSerialNum.1 ==       'C100076544'
        entPhysicalMfgName.1 ==         'Acme'
        entPhysicalModelName.1 ==       '100'
        entPhysicalAlias.1 ==           'cl-SJ17-3-006:rack1:rtr-U3'
        entPhysicalAssetID.1 ==         '0007372293'
        entPhysicalIsFRU.1 ==           true(1)
        entPhysicalMfgDate.1 ==         '2002-5-26,13:30:30.0,-4:0'
        entPhysicalUris.1 ==            'URN:CLEI:CNME120ARA'
    2 slots within the chassis:
        entPhysicalDescr.2 ==           'Acme Chassis Slot Type AA'
        entPhysicalVendorType.2 ==      acmeProducts.slotTypes.1
        entPhysicalContainedIn.2 ==     1
        entPhysicalClass.2 ==           container(5)
        entPhysicalParentRelPos.2 ==    1
        entPhysicalName.2 ==            'S1'
        entPhysicalHardwareRev.2 ==     'B(1.00.01)'
        entPhysicalSoftwareRev.2 ==     ''
        entPhysicalFirmwareRev.2 ==     ''
        entPhysicalSerialNum.2 ==       ''
        entPhysicalMfgName.2 ==         'Acme'
        entPhysicalModelName.2 ==       'AA'
        entPhysicalAlias.2 ==           ''
```

FIG. 6

METHODS, SYSTEMS, AND COMPUTER READABLE MEDIA FOR NETWORK TESTING AND COLLECTING GENERATIVE ARTIFICIAL INTELLIGENCE TRAINING DATA

PRIORITY CLAIM

This application claims the priority benefit of U.S. Provisional Patent Application Ser. No. 63/466,242, filed May 12, 2023, the disclosure of which is incorporated herein by reference in its entirety.

TECHNICAL FIELD

The subject matter described herein relates to network testing. More specifically, the subject matter relates to methods, systems, and computer readable media for network testing and collecting generative artificial intelligence (AI) training data for training a generative AI model for configuring network testing.

BACKGROUND

Setting up a network testing system is a critical endeavor in today's interconnected world, where seamless and reliable communication plays a pivotal role in organizational success. The network infrastructure serves as the backbone for data transmission, application delivery, and overall business operations. To ensure optimal performance, stability, and security, a well-designed network testing system can be imperative. This system encompasses a comprehensive suite of tools, protocols, and methodologies aimed at assessing the network's capabilities, identifying potential bottlenecks, and pinpointing vulnerabilities. By meticulously configuring and deploying such a system, network administrators can proactively monitor, analyze, and troubleshoot network components, thereby fostering an environment of uninterrupted connectivity, enhanced productivity, and heightened user experience for both internal stakeholders and customers alike.

Accordingly, a need exists for methods, systems, and computer readable media for network testing and collecting generative artificial intelligence (AI) training data for training a generative AI model for configuring network testing.

SUMMARY

Methods, systems, and computer readable media for network testing. In some examples, a system includes a test controller and a training data collector. The test controller is configured for receiving a test case including test case definition information defining a network test for a system under test (SUT); determining test system resource information for test system resources configured to execute the test case; and executing the test case on the SUT. The training data collector is configured for collecting at least a portion of the test case definition information; collecting SUT status information or SUT configuration information or both for the SUT; collecting metadata associated with the test case including at least one test context label; and processing the at least a portion of the test case definition information, test system resource information, SUT status information or SUT configuration information (e.g., port configurations, cabling configurations, memory resource allocation, processor resource allocation, switching fabric configuration, routing table information, IP address information, virtual machine configuration information, container configuration information, security policy information, topology/connectivity configuration information, etc.), and metadata to produce artificial intelligence training data.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which:

FIG. 3 is a screen shot of a test case configuration GUI collecting line rate data;

FIG. 5 shows an example REST API structure;

FIG. 6 shows an example of DUT configuration and status information; and

DETAILED DESCRIPTION

The subject matter described herein includes methods, systems, and computer readable media for network testing and collecting generative artificial intelligence (AI) training data for training a generative AI model for configuring network testing.

This document describes a network test system that includes an integrated subsystem dedicated to capturing and generating training data that can be used to train a generative AI (GAI) model (e.g., a large language model) that is configured for driving, at least in part, operation of the network test system during the testing of a device or system under test. An example system can include a GAI training data collector and export subsystem.

In some examples, the system includes a GAI model training/federated learning subsystem that utilizes the training data. The GAI training data collector can be tightly integrated with other components of the network test system, e.g., via internal software-based interfaces, shared memory, shared storage, and the like. The GAI training data collector can be configured to collect data from various components and resources associated with the network test environment and process the collected data into a form that is suitable for training a GAI model.

Figure 1:
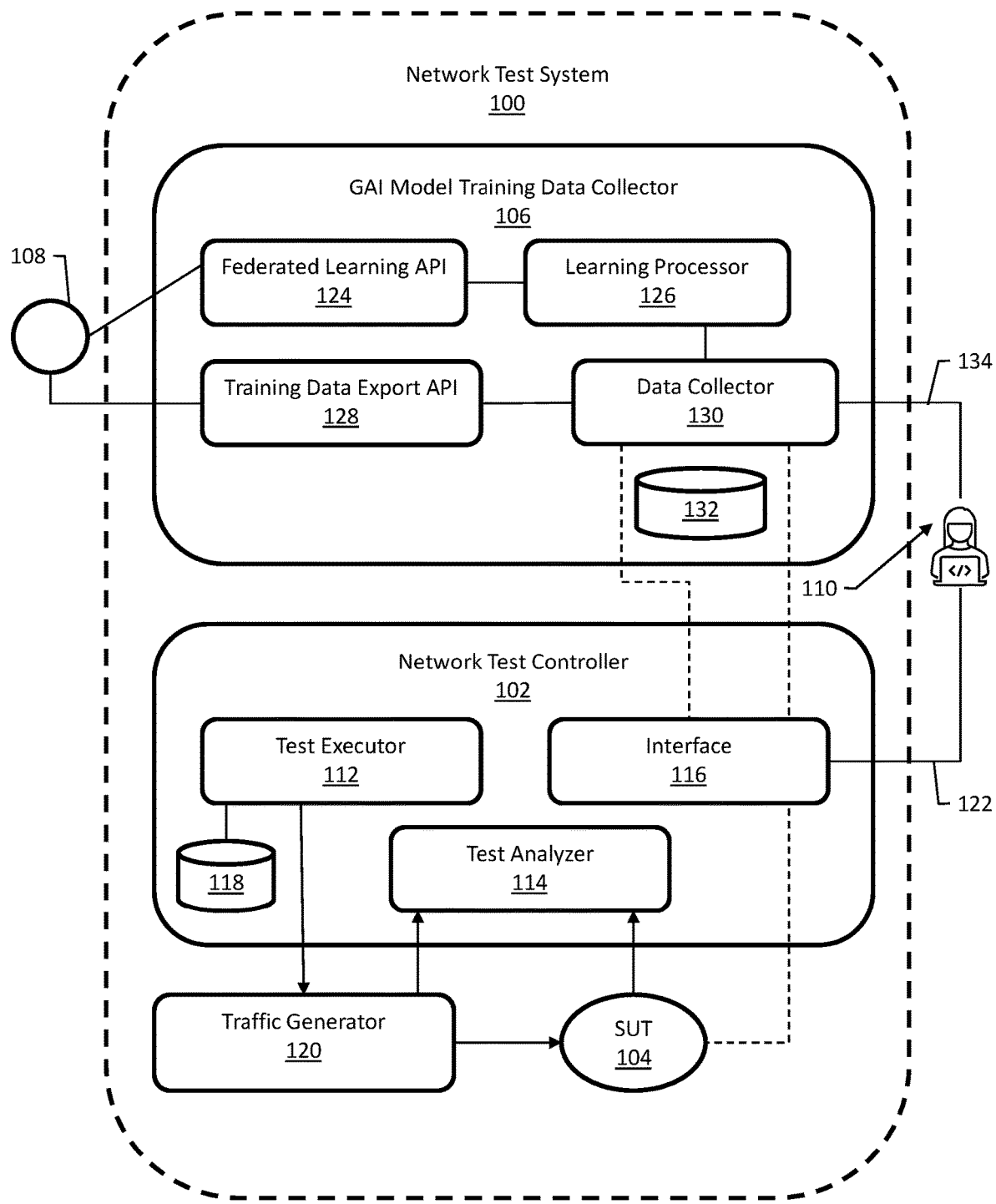
FIG. 1 is a block diagram of an example network test environment.

FIG. 1 is a block diagram of an example network test environment including a network test system 100 setup for network testing and collecting generative artificial intelligence (AI) training data for training a generative AI model for configuring network testing. The network test system 100 includes a network test controller 102 configured for executing a test case to test a system under test (SUT) (or device under test) 104.

The network test system 100 includes a GAI model training data collector 106 configured for collecting generative artificial intelligence (AI) training data for training a generative AI model 108 for configuring network testing. A user 110 (e.g., a network test engineer) can interact with the system 100. It will be appreciated that in some contemplated embodiments, network test system 100 may include multiple, distributed GAI model training data collectors (e.g., multiple GAI model training data collectors deployed across a cloud computing environment or data center environment).

The network test controller 102 includes a test executor 112, a test analyzer 114, and a configuration/user interface 116. The test executor 112 is configured for receiving, e.g., from a repository 118 of test case definitions, a test case including information defining a network test for the SUT 104. The test executor 112 can send instructions to a traffic generator 120 which then sends test traffic to the SUT 104. The test executor 112 and/or the test analyzer 114 can send commands to the SUT 104 to configure it, and the test executor 112 and/or the test analyzer 114 can read status and/or configuration information from the SUT 104.

The test analyzer 114 is configured for receiving at least some output traffic from the SUT 104 and, in some cases, output from the traffic generator 102, e.g., either the test traffic itself or data characterizing the test traffic and, in some cases, operational status information from the DUT/SUT 104 (e.g., CPU utilization, memory utilization, congestion status information, etc.). The test analyzer 114 can produce a test result, e.g., a test report or data characterizing the results of the test.

The user interface 116 is configured for exchanging configuration and reporting data 122 with the user 110. The user interface 116 can be, e.g., a graphical user interface configured for receiving configuration information input by the user 110 and displaying test results and/or reports from the test analyzer 114 to the user 110.

The configuration and reporting data 122 can include, for example, hardware configuration data, software configuration data, test objectives, test parameters, and test reporting and analysis. Hardware configuration data can specify, for example, network devices (e.g., routers, switches, firewalls, load balances, zero trust secure gateways, policy enforcement points, identity providers, and other network equipment involved in the test environment) and test client devices (e.g., personal computers, laptops, smartphones, Internet of Things devices, etc.) to simulate end-user interactions and traffic. Software configuration data can specify, for example, network testing software, network monitoring software, and automation tools.

Test objective data can specify, for example, different types of tests such as a bandwidth test, latency test, packet loss test, jitter test, load test, stress test, and/or security test.

Test parameter data can specify, for example, source and destination addresses, test duration, number of test runs, traffic patterns (e.g., bursty traffic or constant traffic), and/or protocol selection. Test reporting and analysis data can specify, for example, test result format (e.g., comma separated values (CSV), hypertext markup language (HTML), JavaScript object notation (JSON), and the like), graphs and charts, and thresholds for performance metrics and alarms to trigger if thresholds are crossed.

The training data collector 106 includes a data collector 130 and labeler configured for receiving labelling input 134 from the user 110, test case definition information from the interface 116, and SUT status information (or configuration information or both) from the SUT 104 (e.g., via an administrative interface such as simple network management protocol (SNMP) or other appropriate interface). The labeling input 134 can include metadata associated with the test case, which can have one or more test context labels.

A test context label includes text describing or characterizing a test case. For example, when the user 110 configures the network test controller 102 for executing a test case, the user 110 can write text context labels describing, for example, the purpose, parameters, and expected outcomes of each test. Text context labels may include text that is parsed from a filename or other test case definition data/metadata extracted from a test system file e.g., a test case definition or result file, or from a DUT/SUT configuration file or from a DUT/SUT status log file. These labels can be used for training the model 108. The following are examples of text context labels:

1. Test Case Name: Bandwidth Capacity
   Test Description: Measure the maximum achievable bandwidth between two network endpoints.
   Parameters: Source IP, Destination IP, Test Duration, Protocol, Traffic Pattern
   Expected Outcome: Report the maximum bandwidth capacity in Mbps.
2. Test Case Name: Latency Analysis
   Description: Evaluate the delay in transmitting data between network nodes.
   Parameters: Source IP, Destination IP, Test Duration, Protocol Expected
   Outcome: Provide average and maximum latency values in milliseconds.
3. Test Case Name: Packet Loss Assessment
   Description: Measure the loss of data packets during transmission.
   Parameters: Source IP, Destination IP, Test Duration, Protocol
   Expected Outcome: Report packet loss rate as a percentage.
4. Test Case Name: Jitter Evaluation
   Description: Analyze the variation in latency over time.
   Parameters: Source IP, Destination IP, Test Duration, Protocol
   Expected Outcome: Present jitter values in milliseconds.
5. Test Case Name: Load Testing
   Description: Assess network performance under heavy traffic conditions.
   Parameters: Traffic Pattern, Test Duration, Number of Clients, Protocol
   Expected Outcome: Observe network response time and measure system stability.
6. Test Case Name: Stress Testing
   Description: Evaluate network performance under extreme conditions and traffic loads.

Parameters: Test Duration, Number of Clients, Traffic Pattern, Protocol

Expected Outcome: Identify potential bottlenecks and failure points.

7. Test Case Name: Firewall Rule Verification

Description: Verify the effectiveness of firewall rules in blocking unwanted traffic.

Parameters: Source IP, Destination IP, Protocol, Port, Firewall Ruleset

Expected Outcome: Determine whether the firewall correctly allows or denies traffic.

8. Test Case Name: Network Security Audit

Description: Identify vulnerabilities and security loopholes in the network.

Parameters: Scan Type (e.g., Vulnerability Scan, Penetration Test), Target IP Range Expected Outcome: Present a report of identified security issues and potential solutions.

9. Test Case Name: Quality of Service (QOS) Verification

Description: Validate the QoS settings to prioritize specific traffic types.

Parameters: Source IP, Destination IP, Protocol, QoS Rules

Expected Outcome: Ensure that critical traffic receives priority over non-critical traffic.

10. Test Case Name: Network Redundancy Assessment

Description: Evaluate the effectiveness of network redundancy and failover mechanisms.

Parameters: Failover Time, Redundancy Configuration, Test Duration

Expected Outcome: Measure the time taken to recover from network failures.

The training data collector 106 can include a federated learning application programming interface (API) 124, a learning processor 126, and a training data export API 128. In operation, the training data collector 106 processes test case definition information, SUT status information and/or configuration information, and metadata to produce AI training data, and in some cases exports the AI training data to an AI training system to train the model 108. The model 108 can then be used to generate network tests (e.g., test cases and configuration information) in response to text inputs from a user such as a network test engineer.

In another exemplary embodiment, learning processor 126 is adapted to utilize the AI training data to train a local AI model that is part of a federated learning system. The local AI model (e.g., the local AI model's neural network topology, weights, parameters, etc.) is then communicated to an AI model aggregation component of the federated learning system, where it may be combined with other AI models that were trained with other AI training data (e.g., AI training data generated by other GAI training data collectors deployed within a test environment, etc.). It will be appreciated that in such embodiments, raw AI training data generated by the test system is not transmitted from the test system. Only parameters and metadata associated with the locally trained AI model is transmitted in such embodiments, which may be advantageous from a data security/data privacy standpoint.

In some examples, the data collector and labeler 130 is configured to collect test metrics from consenting customers, where the test metrics are pooled into a GAI training data set that can be used to train the GAI model 108. The data collector and labeler 130 can be configured to solicit metadata associated with the collected training data, such as test context/intent labeling information, from the user 110.

For example, training data may be collected by presenting the user 110 with a series of questions via the interface 116. Example questions include:

Why did you run this test?

Is this test associated with any standards-defined specifications? If yes, what are the specifications?

Did the SUT pass the test? If not, why?

Is the SUT going to be used to store/process health insurance portability and accountability act (HIPPA) protected data?

Is the SUT handling data that is subject to international traffic in arms regulations (ITAR)/export controls?

The interface 116 can include, for example, text, graphical, and audio interfaces to facilitate the collection of training data labeling information. In some examples, the metadata can be determined from test result data without querying the user 110, e.g., via SUT health and/or performance status information that is collected automatically during a test and, for example, stored in a test result file.

The resulting model 108 trained on the data and metadata can be used for, e.g., a GAI-driven network test system to configure and execute test cases via natural language user input such as:

Given a type of DUT and an anticipated deployment strategy, what types of tests would make sense to run?

If this system is going to be used to store/process HIPPA-protected data, what tests should be run?

If the system is subject to ITAR/export controls, what tests should be run?

Example test meta label include, but are not limited to:

Label=objective name, e.g., "RFCxxxx Test"

Label=objective type—e.g., performance measurement or goal attainment type

Label=test results—pass/fail

Label=Throughput test

Label=Route convergence test

Label=Load balance test.

Label=Modeling Real Life Incident X, Y, Z

Label=Anomaly/Attack Emulation

In some examples, the data collector and labeler 130 is configured to capture test environment topology data, test resource and associated configuration data, and SUT configuration data. Such data may, for example, be used to train the model 108 such that it is capable of responding to a user's natural language test intent with a recommended test environment/test bed topology (e.g., a collection of test resources, SUT resources, and their connectivity/topology structure), as well as other test system configuration instructions.

In some examples, the network test system 100 is configured to interactively test the effect of the local learning processor 126, for example, for the user 110 to judge the effectiveness of the training. For example, the network test system 100 can include a matching inference processor that is configured to provide the results of local training to help guide the user 110 in providing suitable input. The network test system 100 can be configured to use the input to the inference system (questions applied to the local training data) as input to assist the primary learning system.

Figure 2:
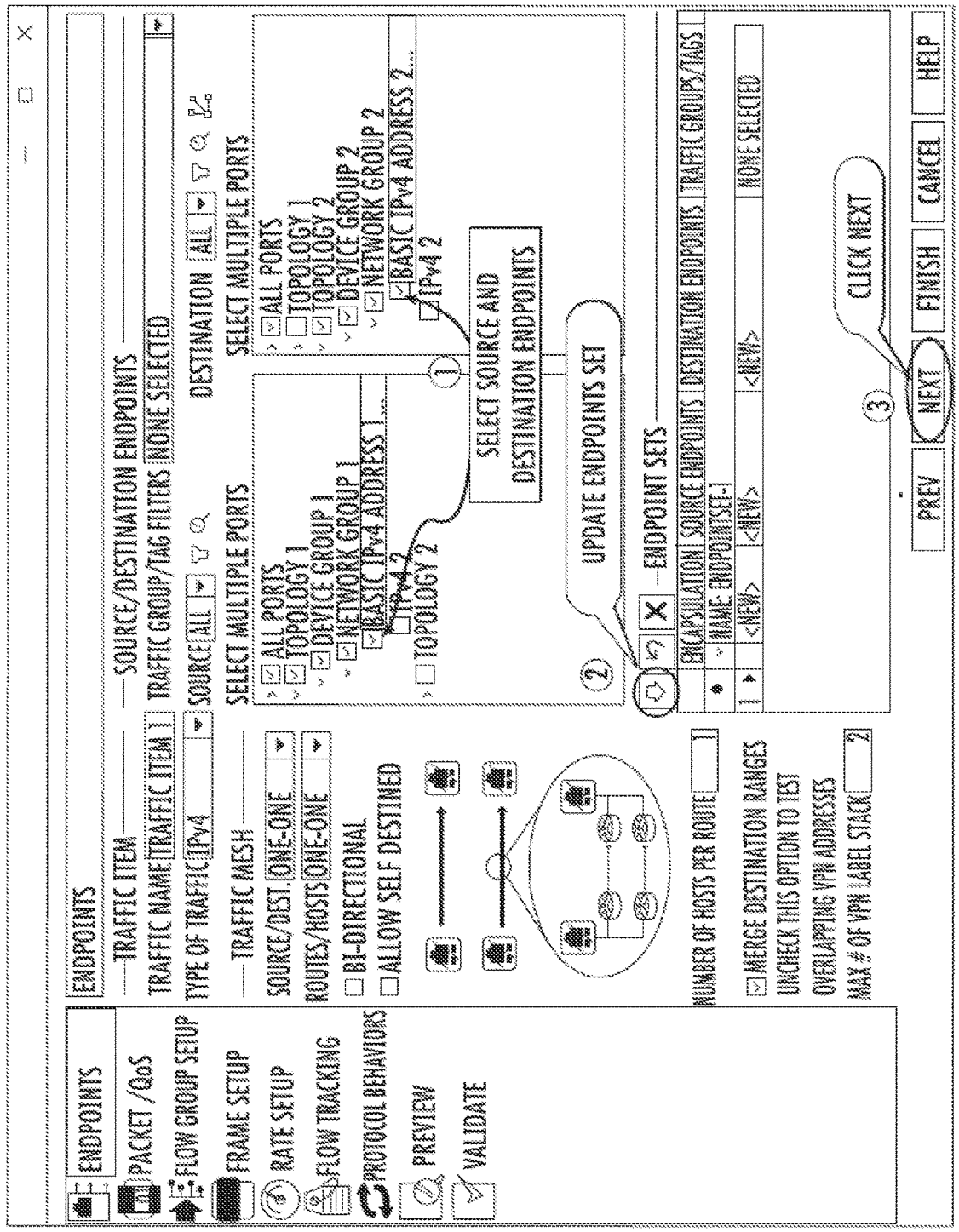
FIG. 2 is a screen shot of a test case configuration GUI collecting emulated endpoint data such as source and destination endpoints.
Figure 3:
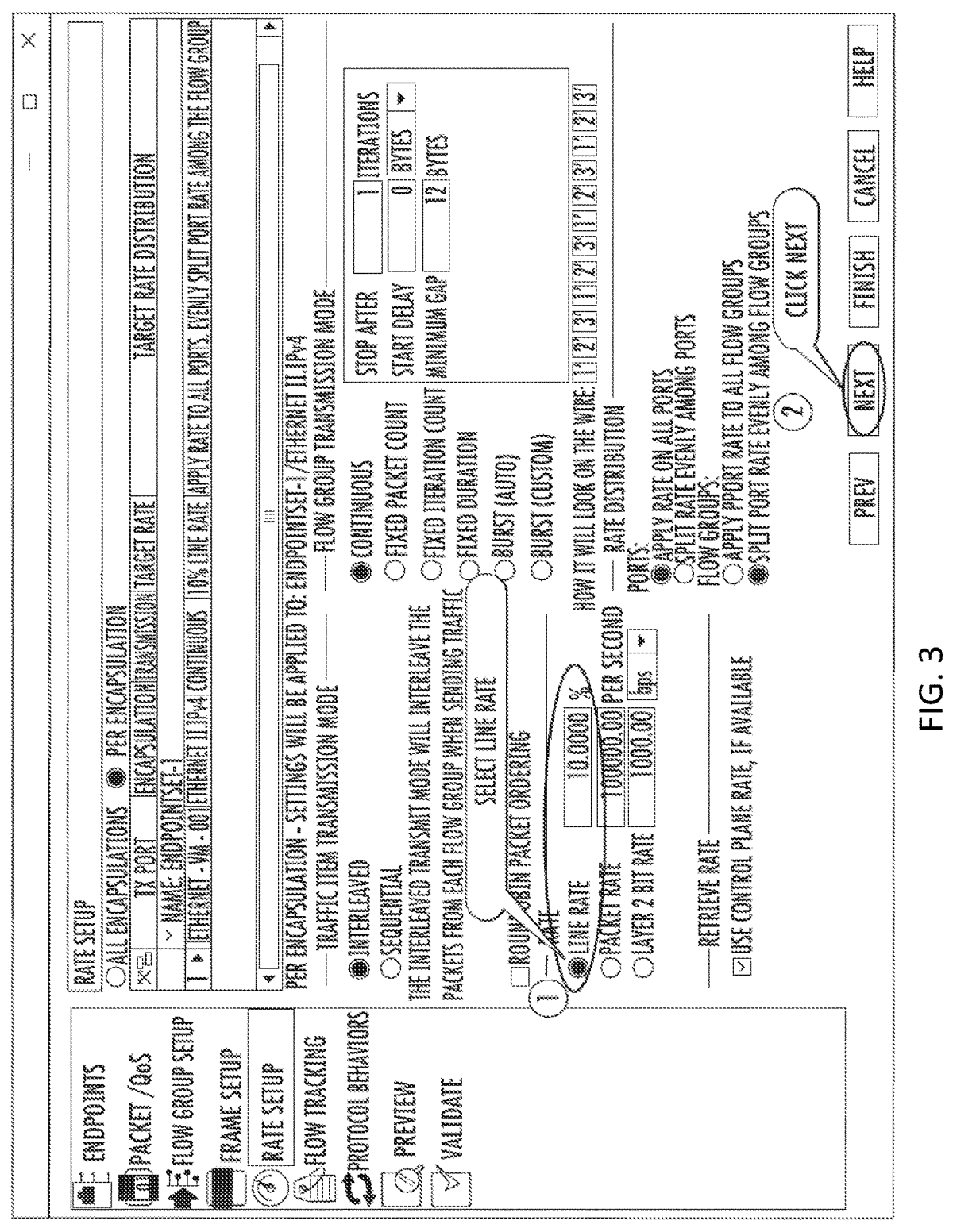
Figure 4:
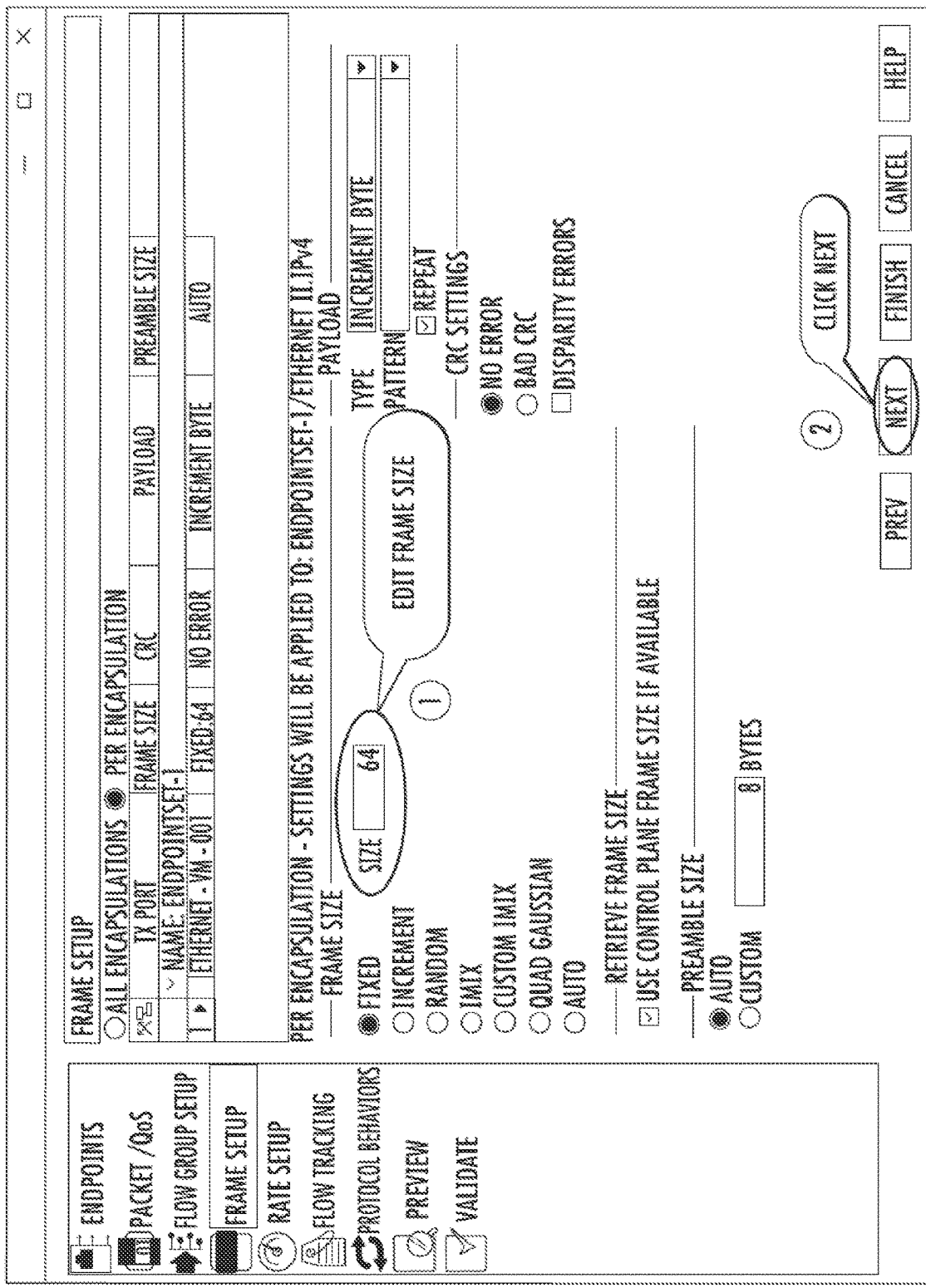
FIG. 4 is a screen shot of a test case configuration GUI collecting frame size data.

FIGS. 2-4 show examples of a test case configuration GUI and associated test case parameters/setting that can be specified by user. Some or all of this test case configuration information may be logged by the training data collector 106 for use in constructing a training data set.

FIG. 2 is a screen shot of a test case configuration GUI collecting emulated endpoint data such as source and destination endpoints. FIG. 3 is a screen shot of a test case configuration GUI collecting line rate data. FIG. 4 is a screen shot of a test case configuration GUI collecting frame size data.

In some examples, the network test system 100 can provide users with an API (e.g., a representational state transfer (REST) API) that can be used to configure a test case. The training data collector 106 can monitor the API communications and extract/log detailed test case definition and associated test system resource configuration information.

FIG. 5 shows an example REST API structure and an associated command used to create a virtual port associated with a test case. The test system API commands may be parsed by the training data collector 106 and relevant test case definition content can be extracted and logged.

FIG. 6 shows an example of DUT configuration and status information that may be obtained by the training data collector 106 and logged for use in constructing an AI training data set. In some examples, the network test system 100 can use SNMP (or a functionally similar protocol or a management interface API, etc.) to access DUT configuration and status information, such as the data stored in a management information base (MIB) associated with or on board the DUT.

In some examples, the training data collector 106 is configured to analyze the collected test system configuration and DUT configuration/status information and apply one or more pre-provisioned training data set collection rules to construct the AI training data set. The training rules may, for example, specify what data/types of data are to be collected and included in a training data set. The user 110 may be queried (e.g., via the interface 116) to solicit the collection/input of missing information/data (e.g., test system configuration information, DUT configuration information, test case label/meta data information, and the like).

The collected data is then processed and/or compiled into a form/format that is suitable for use in training an AI model (e.g., a GAI model). In some examples, the training data collector 106 is tightly integrated with other components of the network test system 100, for example, via internal software-based interfaces, shared memory, shared storage, and the like. The training data collector 106 is configured to collect data from various components/resources associated with the network test system 100 and process this collected data into a form/format that is suitable for training the AI model 108.

The data (after collection and possible labeling and formatting) is then communicated to an associated AI system (e.g., via an external AI API), where it is used to train (or assist in training) the AI model 108. The resulting AI model 108 can then be made available to the network test system 100 for use in configuring and operating the network test controller 102 (or a different test system) to perform a network test on a DUT/SUT. The AI model 108 can be used to assist a user in configuring and operating the network test controller 102 (or a different test system) to perform a network test on a DUT/SUT.

In some examples, the training data collector 106 is configured to use the created training data set along with the local learning processor 126 to train an AI model locally. The local model may be part of a higher-level federated learning architecture associated with a global AI system, where the AI system is configured to configure and operate (or assist in configuring and operating) a test system to perform a network test. For example, a test system user may use the trained model to generate a test case definition/specification based on instructions, intents, and/or goals stated in natural language.

The local model can be, for example, a neural network-based model. The resulting local model can include an artificial neural network topology and associated interconnecting linkage weights, as well as other neural network architectural parameters (e.g., neuron threshold transfer functions). The local model can then be communicated to an associated global AI component of the federal learning system, e.g., via an external API, where it is processed and aggregated/incorporated into the global AI model.

The resulting global AI model can then be made available to the network test system 100 for use in configuring and executing test cases. For instance, once trained, the global AI model can be used to generate a test case definition/specification based on instructions, intents, and/or goals stated in a natural language.

Figure 7:
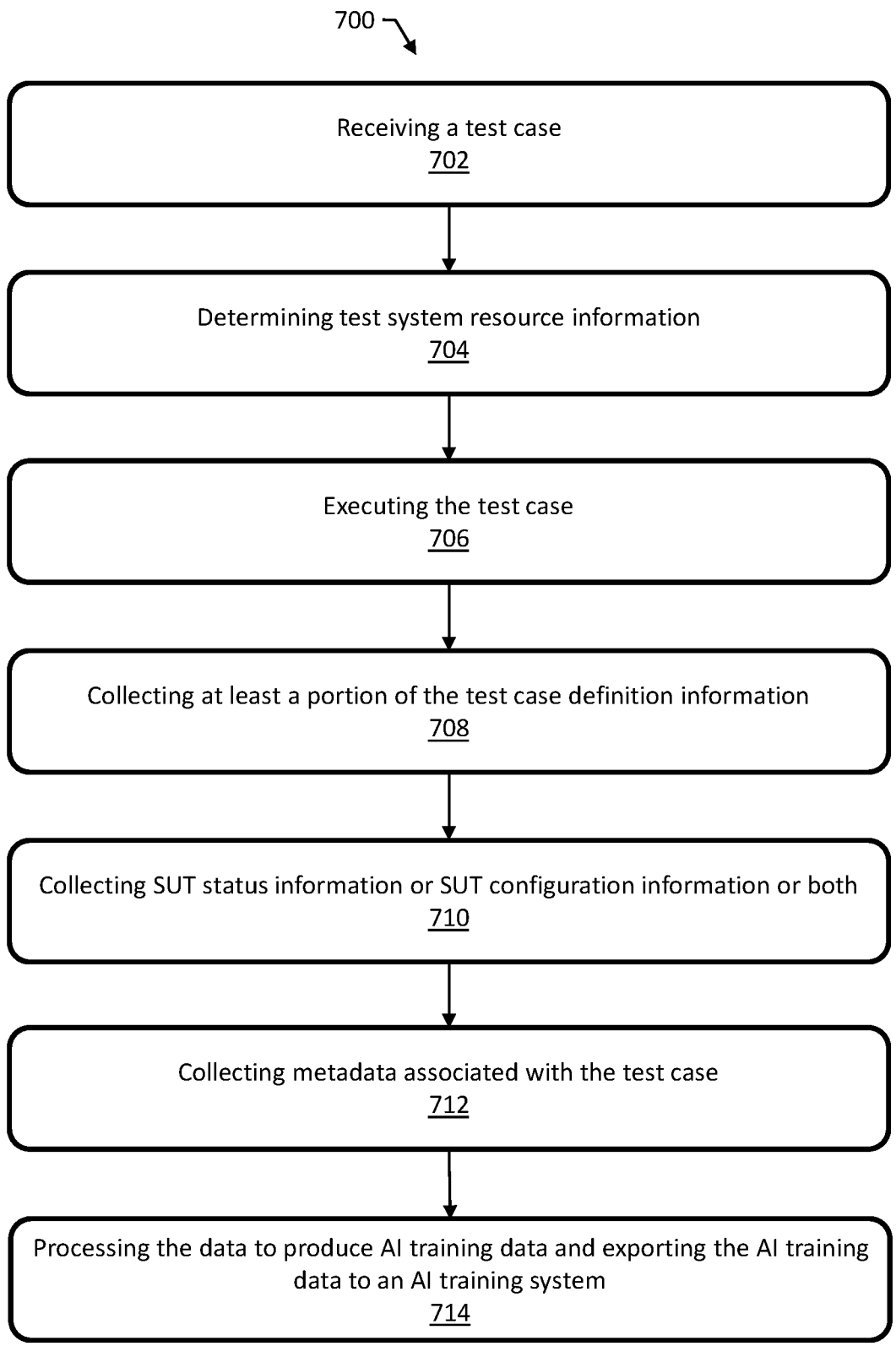
FIG. 7 is a flow diagram of an example method for network testing.

FIG. 7 is a flow diagram of an example method 700 for network testing. The method 700 can be performed by the network test system 100 of FIG. 1.

The method 700 includes receiving, by a network test controller implemented on at least one processor and memory storing instructions for the processor, a test case including test case definition information defining a network test for a SUT (702). The SUT can include one or more networking devices and possibly other appropriate components. The test case definition information can specify one or more of: test traffic generators, transmit ports, receive ports, load modules, test environment topology details, test traffic types, test protocols, test traffic generation rates, test connection/teardown rates, packet sizes, and timeout settings.

The method 700 includes determining, by the network test controller, test system resource information for test system resources configured to execute the test case (704). Test system resource information can include, for example, resource configuration instructions for configuring test system resources. The method 700 includes executing, by the network test controller, the test case on the SUT (706).

The method 700 includes collecting, by a training data collector implemented on at least one processor and memory storing instructions for the processor, at least a portion of the test case definition information (708). The method 700 includes collecting SUT operational status/performance information or SUT configuration information or both for the SUT (710). The method 700 includes collecting metadata associated with the test case including at least one test context label (712). Collecting SUT status information or SUT configuration information can include polling the SUT via an administrative interface.

The method 700 includes processing the at least a portion of the test case definition information, test system resource information, SUT status information or SUT configuration information, and metadata to produce artificial intelligence training data (714). Processing the data can include formatting the data and transforming the data as needed so that it is suitable for supplying to the AI training system. In some examples, processing the at least a portion of the test case definition information, SUT status information or SUT configuration, and metadata to produce artificial intelligence training data includes correlating and associating one or more natural language labels of the metadata with the portion of the test case definition information.

In some examples, the method 700 includes exporting the artificial intelligence training data to an artificial intelligence training system by exporting the artificial intelligence training data to an external system via an interface and a data communications network. The method 700 can include training, using a federated learning architecture, an artificial intelligence model configured for producing one or more test cases in response to a natural language query.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A network test system for network testing, the network test system comprising:
    a test controller implemented using at least one hardware or firmware processor and configured for:
        receiving a test case including test case definition information defining a network test for a system under test (SUT);
        determining test system resource information for test system resources configured to execute the test case; and
        executing the test case on the SUT;
    a generative artificial intelligence (GAI) model training data collector implemented as an integrated subsystem of the network test system, the GAI model training data collector being configured for:
        collecting at least a portion of the test case definition information;
        collecting SUT status information or SUT configuration information or both for the SUT;
        collecting metadata associated with the test case including at least one test context label; and
        processing the at least a portion of the test case definition information, test system resource information, SUT status information or SUT configuration information, and metadata to produce artificial intelligence (AI) training data for training a generative AI model to drive operation of a test system in testing a network device under test by transmitting packets to the device under test.

2. The network test system of claim 1, wherein collecting SUT status information or SUT configuration information or both comprises polling the SUT via an administrative interface.

3. The network test system of claim 1, wherein the test case definition information specifies one or more of: test traffic generators, transmit ports, receive ports, load modules, test environment topology details, test traffic types, test protocols, test traffic generation rates, test connection/teardown rates, packet sizes, and timeout settings.

4. The network test system of claim 1, wherein processing the at least a portion of the test case definition information, SUT status information or SUT configuration, and metadata to produce artificial intelligence training data comprises correlating and associating one or more natural language labels of the metadata with the portion of the test case definition information.

5. The network test system of claim 1, comprising the artificial intelligence training system, wherein the artificial intelligence training system is configured for using the artificial intelligence training data to train an artificial intelligence model configured for producing one or more test cases in response to a natural language query.

6. The network test system of claim 1, wherein the training data collector is configured for exporting the artificial intelligence training data to an artificial intelligence training system by exporting the artificial intelligence training data to an external system via an interface and a data communications network.

7. The network test system of claim 1, wherein the network test system is configured for training, using a federated learning architecture, an artificial intelligence model configured for producing one or more test cases in response to a natural language query.

8. A method for network testing, the method comprising:
    receiving, by a network test system, a test case including test case definition information defining a network test for a system under test (SUT);
    determining, by the network test system, test system resource information for network test system resources configured to execute the test case;
    executing, by the network test system, the test case on the SUT;
    collecting, by a generative artificial intelligence (GAI) model training data collector implemented as an integrated subsystem of the network test system, at least a portion of the test case definition information;
    collecting, by the GAI model training data collector, SUT status information or SUT configuration information or both for the SUT;
    collecting, by the GAI model training data collector, metadata associated with the test case including at least one test context label; and
    processing, by the GAI model training data collector, the at least a portion of the test case definition information, test system resource information, SUT status information or SUT configuration information, and metadata to produce artificial intelligence training data for training a generative AI model to drive operation of a test system in testing a network device under test by transmitting packets to the device under test.

9. The method of claim 8, wherein collecting SUT status information or SUT configuration information or both comprises polling the SUT via an administrative interface.

10. The method of claim 8, wherein the test case definition information specifies one or more of: test traffic generators, transmit ports, receive ports, load modules, test environment topology details, test traffic types, test protocols, test traffic generation rates, test connection/teardown rates, packet sizes, and timeout settings.

11. The method of claim 8, wherein processing the at least a portion of the test case definition information, SUT status information or SUT configuration, and metadata to produce artificial intelligence training data comprises correlating and associating one or more natural language labels of the metadata with the portion of the test case definition information.

12. The method of claim 8, comprising using the artificial intelligence training data to train an artificial intelligence model configured for producing one or more test cases in response to a natural language query.

13. The method of claim 8, comprising exporting the artificial intelligence training data to an artificial intelligence training system by exporting the artificial intelligence training data to an external system via an interface and a data communications network.

14. The method of claim 8, comprising training, using a federated learning architecture, an artificial intelligence model configured for producing one or more test cases in response to a natural language query.

15. A non-transitory computer readable medium storing executable instructions that when executed by at least one processor of a computer control the computer to perform operations comprising:
- receiving, by a network test system, a test case including test case definition information defining a network test for a system under test (SUT);
- determining, by the network test system, test system resource information for test system resources configured to execute the test case;
- executing, by the network test system, the test case on the SUT;
- collecting, by a generative artificial intelligence (GAI) model training data collector implemented as an integrated subsystem of the network test system, at least a portion of the test case definition information;
- collecting, by the GAI model training data collector, SUT status information or SUT configuration information or both for the SUT;
- collecting, by the GAI model training data collector, metadata associated with the test case including at least one test context label; and
- processing, by the GAI model training data collector, the at least a portion of the test case definition information, test system resource information, SUT status information or SUT configuration information, and metadata to produce artificial intelligence training data for training a generative AI model to drive operation of a test system in testing a network device under test by transmitting packets to the device under test.

16. The non-transitory computer readable medium of claim 15, wherein collecting SUT status information or SUT configuration information or both comprises polling the SUT via an administrative interface.

17. The non-transitory computer readable medium of claim 15, wherein the test case definition information specifies one or more of: test traffic generators, transmit ports, receive ports, load modules, test environment topology details, test traffic types, test protocols, test traffic generation rates, test connection/teardown rates, packet sizes, and timeout settings.

18. The non-transitory computer readable medium of claim 15, wherein processing the at least a portion of the test case definition information, SUT status information or SUT configuration, and metadata to produce artificial intelligence training data comprises correlating and associating one or more natural language labels of the metadata with the portion of the test case definition information.

19. The non-transitory computer readable medium of claim 15, comprising using the artificial intelligence training data to train an artificial intelligence model configured for producing one or more test cases in response to a natural language query.

20. The non-transitory computer readable medium of claim 15, comprising training, using a federated learning architecture, an artificial intelligence model configured for producing one or more test cases in response to a natural language query.

* * * * *